Dec. 16, 1969  J. V. MILITELLO  3,484,156
WELDING GOGGLES WITH REMOVABLE PROTECTIVE LENS COVER
Filed June 22, 1967
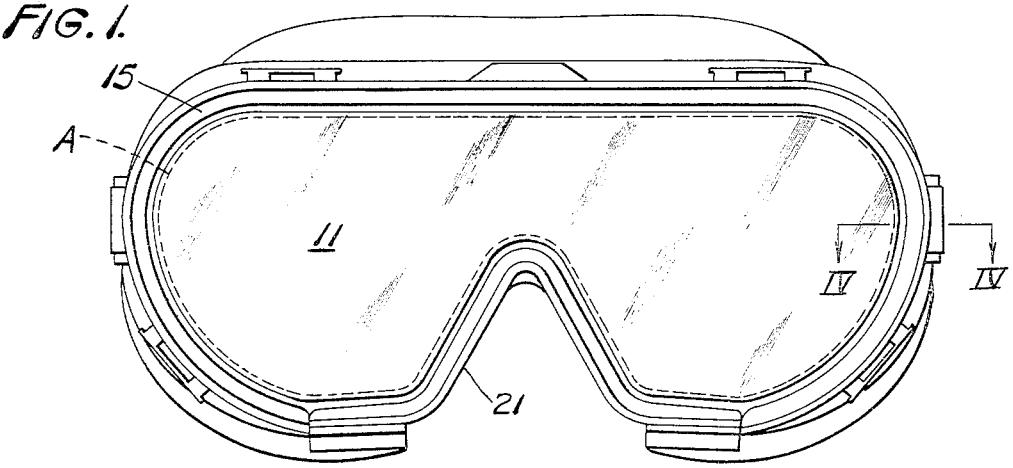
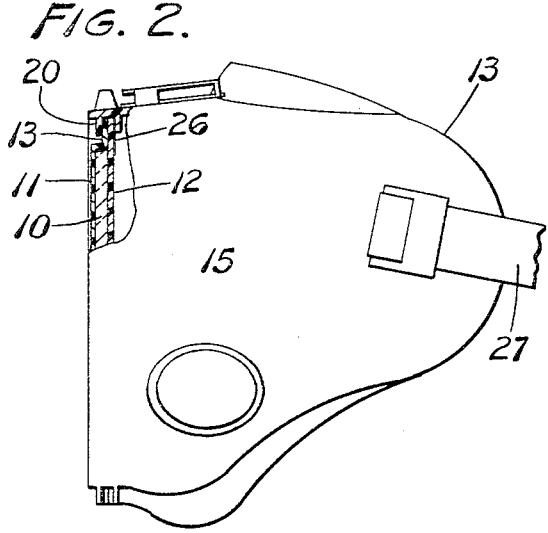
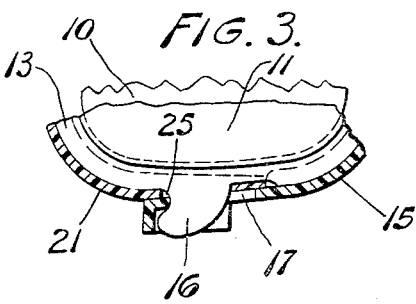
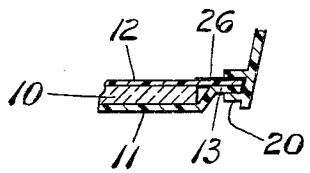
INVENTOR.
JAMES V. MILITELLO
BY
*Christel & Bean*
ATTORNEYS United States Patent Office 3,484,156
Patented Dec. 16, 1969

3,484,156
WELDING GOGGLES WITH REMOVABLE
PROTECTIVE LENS COVER
James V. Militello, Buffalo, N.Y., assignor to American
Allsafe Company, Inc., Buffalo, N.Y.
Filed June 22, 1967, Ser. No. 648,115
Int. Cl. G02c 7/10
U.S. Cl. 351—44                                    3 Claims

ABSTRACT OF THE DISCLOSURE

Safety goggles for filtering out harmful light rays such as infrared and ultraviolet having a glass light filtering lens member extending across both eyes of a user and encapsulated between two members of plastic sheet material, which members have marginal formations projecting the glass lens members for interlocking engagement in a frame comprising a flexible curvilinear wall surrounding the encapsulated lens member at its front edge and shaped to fit the wearer's face at its rear edge.

BACKGROUND OF THE INVENTION

Field of the invention

This invention relates to industrial welding goggles wherein the lens or lenses are of special glass having filtering properties to block the passage of infrared light rays, ultraviolet light rays, or both.

Description of the prior art

Industrial safety goggles for protecting the eyes of the wearer against mechanical hazards such as flying objects or particles or spray material are well known wherein a single lens member of flat or bowed plastic material extends continuously across both eyes of the user, the plastic lens member having marginal hooks or similar formations for interlocking engagement in a plastic frame which consists of a curvilinear wall which encircles the plastic lens member at the front edge of the wall and extends rearwardly and is shaped at its rear edge to fit the face of the wearer. Lenses for such goggles are conventionally of plastic material since glass cannot, as a practical and economic matter, be formed to interlock in the plastic framing wall and, even if so formed at considerable cost, would be subject to a high degree of breakage due to the projecting nature of the ears or lugs of the lens by means of which the lens is attached to or interlocked with the plastic framing member.

Since plastic lenses of the above description cannot be manufactured with suitable light filtering properties for use in welding or like industrial or other operations, welding goggles are usually made with a pair of circular glass lens members which are individually mounted at the front of the goggles by means of threaded retaining collars or the like. Thus the construction and design of welding goggles are conventionally quite separate and distinct from the construction of unitary safety goggles wherein a single continuous plastic lens may be employed.

In another known type of welding goggles a rectangular glass light filtering lens extends across both eyes of the wearer but the rectangular shape of the lens necessitates positioning the same well forward of the wearer's face to clear his nose. This restricts the visual range, requires a relatively deep housing, and makes an awkward and cumbersome device from the standpoint of the wearer.

SUMMARY OF THE INVENTION

The present invention provides the advantages of safety goggles of the unitary continuous plastic lens type in goggles suitable for use in welding and other operations which require filtration of harmful light rays. Speaking generally, this is accomplished by providing a glass lens member suitable light filtering properties which extends transversely continuously across both eyes of the user, with a curved notch to clear the wearer's nose, and is retained between a pair of plastic sheet members disposed at the front and rear faces of the glass lens member and which extend marginally beyond the glass lens member, the marginal portions of one or both of the sheet members being offset toward the other to enclose the edge of the glass lens member. One or both of the plastic sheet members which thus encapsulate the glass lens member include marginal projections or formations for interlocking engagement with a frame member which is very similar to the frame members employed with conventional all-plastic industrial safety goggles of the type which give only mechanical protection to the eyes of the user.

Thus the broad field of vision afforded by goggles of this latter type is made available for welding or other purposes requiring light filtration. Furthermore, a more economical goggle construction is afforded than in prior art welding goggles wherein separate lens members and separate lens mounts have been and are conventionally employed. In addition to the foregoing, by virtue of the welding goggle construction of the present invention, either the welding goggle lens arrangement of the present invention, or the flat plastic lens arrangement of conventional mechanical safety goggles, may be interchangeably employed in the same frame member. This latter feature provides advantages of economy in manufacture, in the stocking of parts by distributors or industrial tool rooms, and the like, and enables smaller users to interchangeably use welding lens arrangements or ordinary plastic lens arrangements interchangeably in a single frame as the need arises.

BRIEF DESCRIPTION OF THE DRAWING

FIG. 1 is a general front elevational view of an assembled pair of goggles of one form of the present invention;

FIG. 2 is a side elevational view of the goggles of FIG. 1 with a front portion broken away for added illustration;

FIG. 3 is a fragmentary cross-sectional view of the frame portion adjacent to the right-hand end of the nose opening of the goggles of FIG. 1, viewed similarly to FIG. 1; and FIG. 4 is a cross-sectional view taken approximately as indicated by the line IV—IV of FIG. 1.

DESCRIPTION OF THE PREFERRED EMBODIMENT

Like characters of reference denote like parts in the several figures of the drawing and a lens member 10 of glass, having the quality of filtering out infrared or ultraviolet light rays, or both, extends horizontally to cover both of the eyes of the wearer and is notched at its lower central portion to accommodate the wearer's nose. In FIG. 1 the continuous dotted line marked A indicates the outline of lens member 10. In the present instance the means for enclosing or encapsulating lens member 10 comprises a front plastic sheet member 11 and a rear plastic sheet member 12. The former is marginally offset, as clearly shown in FIG. 2 whereby its marginal edge portion 13 lies flat against the marginal edge portion of the rear flat plastic sheet member 12, the lens member 10 being thus completely enclosed between the plastic sheet members 11 and 12.

A main frame member 15 extends across the top and along the sides of the assembly comprising the lens members 10 and the front and rear encapsulating sheets 11 and 12 and terminates generally at the lower part of the assembly at opposite sides of the nose notch thereof. As shown in FIG. 3, the plastic facing sheets 11 and 12 are jointly provided with a pair of hook formations 16 for interlocking engagement with an opening 17 in frame member 15.

The rear edge of frame member 15 is curved, as indicated at 13 in FIG. 2 to fit closely against the face of the wearer and the interior of the frame member 15 adjacent to its front edge portion is provided with an inwardly directed channel formation 20 which fits over the abutting edges of the facing sheets 11 and 12.

A nose portion framing member is designated 21 and generally forms a continuation of the main frame member 15, being provided in a similar manner with a channel formation which fits over the abutting marginal edges of the nose notch portions of the facing sheets 11 and 12. The nose portion 21 is preferably formed of a relatively soft plastic material to provide a comfortable nose rest for the goggles. The end portions of nose framing member 21 are notched as at 25 to fit over hook formation 16, being retained in assembled position by the overlying portions of the main framing member 15, as shown in FIG. 3. If desired the nose portion framing member may be combined integrally with the main frame member 15 as is well known in this art.

As indicated at 26 in FIG. 4, the rear face of rear facing sheet 12 is coated from its outer marginal edge inwardly to a point at least as far in as the edge of the glass lens member 10 with an opaque coating so that harmful light rays cannot pass through the goggles between the outer edges of the lens member 10 and the inner edges of the frame members 15 and 21. A head band 27 is attached to opposite sides of the main framing member 15 in an adjustable manner as indicated in FIG. 2.

It will thus be seen that after the facing sheets 11 and 12 are applied to the inner and outer faces of lens 10, this assembly is detachably engaged with the frame means in the same manner as in certain forms of conventional safety goggles such, for instance, as that shown and described in Sterne et al., Patent 2,914,770, dated Dec. 1, 1959. By the same token, the present composite lens structure with a filtering glass lens encased in sheet plastic material may be interchangeably employed in a given frame means with a flat plastic lens member of the form shown in the aforesaid Sterne et al. patent.

The interfitting of the sheet members 11 and 12 in the channel formation 20 of frame 15 retains the sheet members 11 and 12 and lens member 10 in assembled relation with respect to each other and mere removal of the lens and sheet member assembly from the frame means completely disassembles the goggles.

While the lens member is referred to generally herein as being of glass, since glass is presently the most common light filtering material of this type, it is to be understood that the light filtering lens member may be of special plastic or other materials having light filtering properties. Whatever material is employed in the light filtering lens, the plastic sheet facing member protects the surface of the light filtering material against abrasion and other surface damage.

What is claimed is:

1. Goggle construction comprising an oblong lens member extending across both eyes of the wearer and comprising a sheet of light filtering material, a pair of plastic sheet members removably positioned at the opposed front and rear faces of said lens member and projecting marginally beyond said lens member, at least one of said sheet members having its marginal portions offset toward the other sheet member to abut the same and enclose the edge portions of said lens member, and flexible frame means of substantial width having a rear edge shaped to fit the contour of a wearer's face and a front edge generally surrounding said lens member and said sheet members, the abutting marginal portions of said sheet members having projecting formations for joint detachable interfitting engagement within said frame means for retaining the sheet members and the enclosed lens member in assembled relation with respect to each other, said lens member being freely removable from between said sheet members by disconnection of the latter from said frame means.

2. Goggle construction in accordance with claim 1 wherein said frame means comprises a main frame member of somewhat flexible plastic material and a supplemental nose portion frame member of softer plastic material for resting against the wearer's nose.

3. Goggle construction in accordance with claim 1 wherein the marginal portion of one of said sheet members is rendered opaque inwardly to said lens member to prevent passage of undesired light rays between the edge portions of said lens member and said frame means.

References Cited

UNITED STATES PATENTS

| 955,278 | 4/1910 | Minor | 351—62 |
|---|---|---|---|
| 2,914,770 | 12/1959 | Sterne et al. | 2—14.8 |

FOREIGN PATENTS 590,289  7/1947  Great Britain.

DAVID SCHONBERG, Primary Examiner

ROBERT L. SHERMAN, Assistant Examiner

U.S. Cl. X.R.

351—166